(No Model.)
J. ROBERSON.
CULTIVATOR.
No. 417,442. Patented Dec. 17, 1889.
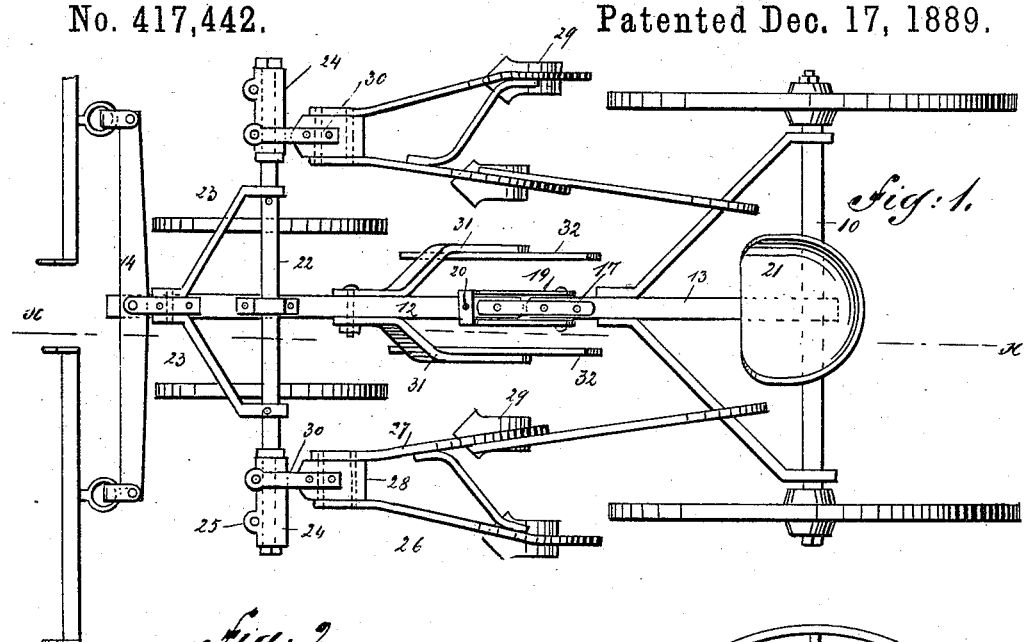
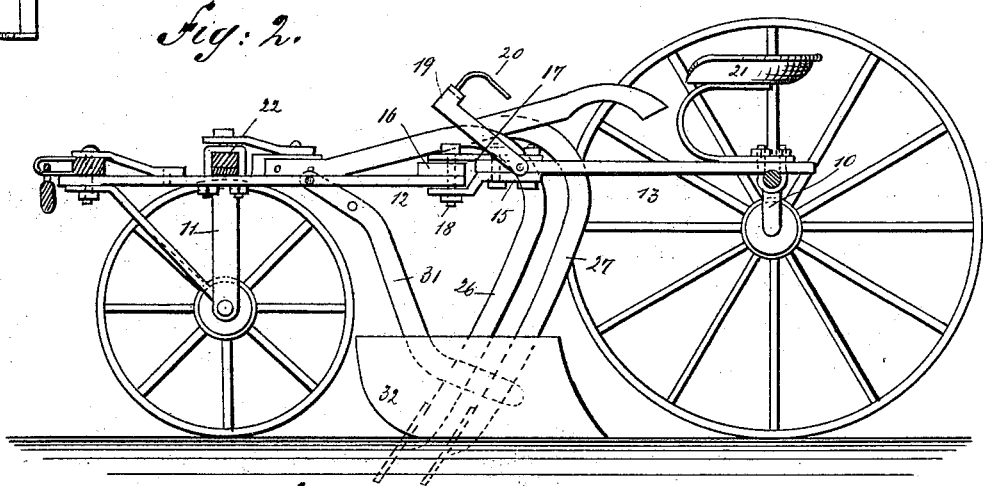
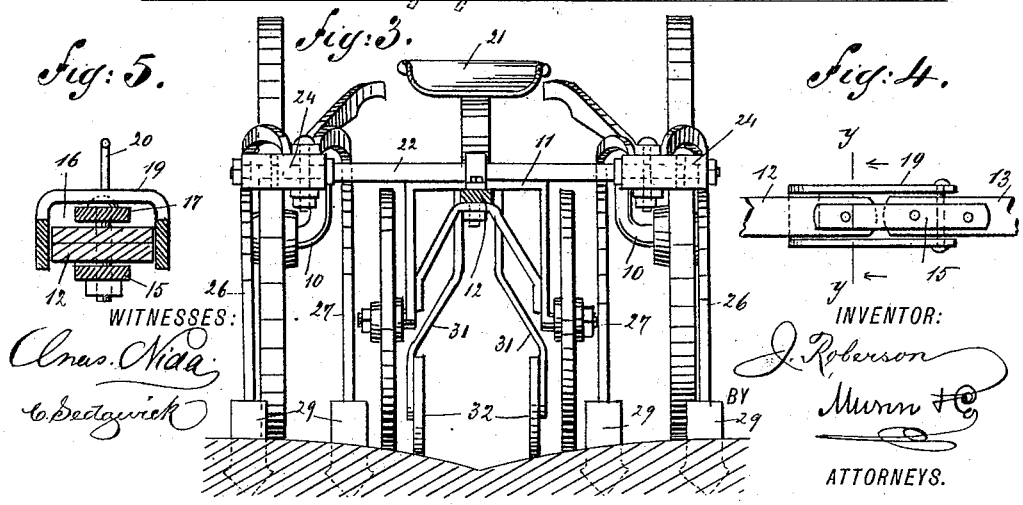
WITNESSES:
Chas. Nida
C. Sedgwick
INVENTOR:
J. Roberson
BY
Munn & Co
ATTORNEYS.

UNITED STATES PATENT OFFICE.

JASPER ROBERSON, OF TARKIO, MISSOURI.

CULTIVATOR.

SPECIFICATION forming part of Letters Patent No. 417,442, dated December 17, 1889.

Application filed June 10, 1889. Serial No. 313,706. (No model.)

*To all whom it may concern:*

Be it known that I, JASPER ROBERSON, of Tarkio, in the county of Atchison and State of Missouri, have invented a new and useful Improvement in Cultivators, of which the following is a full, clear, and exact description.

My invention relates to an improvement in cultivators, and has for its object to provide an implement of simple, durable, and economical construction, having four wheels and a front section capable of being readily turned at the end of the row and yet rigidly held when the row is being cultivated.

To that end the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the improved cultivator. Fig. 2 is a longitudinal section on line $x$ $x$ of Fig. 1. Fig. 3 is a front elevation. Fig. 4 is a bottom plan view of the joint in the reach or draft bar, and Fig. 5 is a section on line $y$ $y$ of Fig. 4.

In carrying out the invention a forward and a rear axle 10 and 11 are employed, which axles are essentially U-shaped or bowed, the forward axle being much shorter than the rear axle.

The reach or draft bar is divided into a front section 12 and a rear section 13, and the two sections are pivotally connected at or near the center of the implement, as will be hereinafter described. The rear extremity of the rear section 13 of the reach-bar is rigidly secured to the rear axle at or near its center, and the forward section 12 of the reach or draft bar is clipped or otherwise secured to the under face of the forward axle, and is made to extend beyond the said axle, as illustrated in Fig. 2. Upon the forwardly-extending end of the reach or draft bar a doubletree 14, of any approved construction, is pivoted.

An angle bracket-bar 15 is secured to the under face of the rear reach or draft bar section 13, the forward end of which bracket extends downward and horizontally beyond the forward end of the said section, as illustrated in Fig. 2. Upon the horizontal forward surface of the bracket 15 the rear end of the front reach or draft bar section 12 is made to rest, and upon the upper surface of this section, at its rear end, a block 16 is securely fastened, the upper surface of the said block being preferably in a plane with the upper surface of the rear section 13 of the draft-bar.

A tie-plate 17 is rigidly secured at one end to the upper face of the rear draft-bar section at the forward end of the same, which tie-plate extends over the block 16, and the forward and rear sections of the draft-bar are united by a bolt or pin 18, passed through the tie-plate, the block, the forward section, and the bracket 15. The forward section of the draft-bar is thus capable of being carried laterally in either direction, as the connection between the two sections is a pivotal one. This is very necessary when the end of the row is reached and it becomes necessary to turn the implement in order to start upon another row. When the row is started and the implement is to be drawn straight ahead, or essentially so, it is necessary that the connection between the reach or draft bar sections should be rigid, and to that end an essentially U-shaped clasp 19 is pivoted at the extremities of its members to the rear draft-bar section, one member contacting with each side of the latter. The bow-section of the clasp connects with the members thereof at the upper edge near its forward end, and the said bow-section is provided with a hook, a staple, or an eye 20, to which a line may be secured leading to the driver's seat 21, said seat being preferably attached to the reach or draft bar immediately over the rear axle 10. It will thus be readily observed that when the clasp is permitted to fall downward it contacts with the block 16 of the forward reach or draft-bar section and rigidly unites both the sections 13 and 12 of the said bar. When a corner is to be turned, the clasp is lifted, to permit the forward section to swing to the right or to the left, by the driver drawing upon the line attached to the said clasp.

Immediately over the forward axle 11 a transverse bar or beam 22 is secured to the forward section of the reach or draft bar, preferably by means of the same clip uniting the said bar to the forward axle, and this transverse bar or beam is stayed at each side of its center by horizontal braces 23, attached to the cross-bar and to the reach or draft bar, as best illustrated in Fig. 1. Thus the cross bar or beam is held at all times at a right angle to the reach or draft bar. Upon each outer extremity of this transverse bar or beam 22 a metal sleeve 24 is loosely secured, preferably provided upon its forward longitudinal edge with two or more eyes 25, to which eyes the plow-beams are attached. By this construction the plow-beams are adjusted toward or from the draft-bar.

Two plow-beams 26 and 27, united at their upper ends by a block 28 and provided at their lower ends with a suitable plow 29, are attached to each of the sleeves 24 by means of an arm 30, rigidly bolted or otherwise secured to the block 28, the forward ends of the said arms 30 being attached to the sleeve by passing a bolt, pin, or other device through the arm and down through one of the sleeve-eyes 25.

It will be readily understood that one plow-beam may be made shorter than the other, if so desired.

At each side of the forward reach or draft bar section 12 a downwardly-curved bar 31 is secured, each bar having attached at its lower end a shield 32 of the ordinary construction. The forward wheels are so spaced that the shields will travel just inside the track of the said wheels.

Having thus described my invention, I claim as new and desire to secure by Letters Patent—

1. In a four-wheeled cultivator, the combination, with a front and rear axle, of a reach or draft bar constructed in two sections pivotally united, and a clasp pivoted to one section adapted to embrace the opposed section, substantially as shown and described.

2. In a four-wheeled cultivator, the combination, with a rear axle and a shorter forward axle, of a reach or draft bar constructed in two sections pivotally united, and an essentially U-shaped clasp pivoted at the extremities of its members to one section of the bar, the said clasp being adapted to embrace an offset upon the opposed section, substantially as shown and described, whereby when the clasp is disengaged from the offset section the said section may be moved laterally, and when the clasp engages with the said section the two sections will rigidly connect, as set forth.

3. In a four-wheeled cultivator, the combination, with a front and rear axle and a reach-bar constructed in two sections pivotally united, of an essentially U-shaped clasp pivoted at the extremities of its members to one bar-section and adapted to engage with an offset upon the opposed section, a cross-bar secured to the forward section of the reach or draft bar, and plow-beams adjustably secured to the extremities of the said cross-bar, all combined for operation substantially as shown and described.

4. In a four-wheeled cultivator, the combination, with a rear axle, a shorter forward axle, and a reach or draft bar comprising two sections, respectively secured to the front and rear axles and pivotally connected at their inner ends, of an essentially U-shaped clasp pivoted to one section and adapted to embrace an offset upon the opposed section, a cross-bar secured to the forward reach or draft bar section above the forward axle, plow-beams adjustably secured to each end of the said cross-bar, and means, substantially as shown and described, for elevating the reach or draft bar clasp, as and for the purpose specified.

JASPER ROBERSON.

Witnesses:
S. E. MARSH,
A. L. GRAY.